(12) United States Patent
Hartmann et al.

(10) Patent No.: US 10,788,572 B2
(45) Date of Patent: Sep. 29, 2020

(54) LASER SCANNER, DEFLECTION MIRROR ARRANGEMENT FOR IT, AND OPTICAL SEPARATING MEANS FOR A DEFLECTION MIRROR ARRANGEMENT

(71) Applicant: VALEO Schalter und Sensoren GmbH, Bietigheim-Bissingen (DE)

(72) Inventors: Werner Hartmann, Bietigheim-Bissingen (DE); Sorin Popescu, Bietigheim-Bissingen (DE); Peter Horvath, Bietigheim-Bissingen (DE)

(73) Assignee: Valeo Schalter und Sensoren GmbH, Bietigheim-Bissingen (DE)

( * ) Notice: Subject to any disclaimer, the term of this patent is extended or adjusted under 35 U.S.C. 154(b) by 471 days.

(21) Appl. No.: 15/536,451

(22) PCT Filed: Dec. 11, 2015

(86) PCT No.: PCT/EP2015/079335
§ 371 (c)(1),
(2) Date: Jun. 15, 2017

(87) PCT Pub. No.: WO2016/096624
PCT Pub. Date: Jun. 23, 2016

(65) Prior Publication Data
US 2017/0350966 A1    Dec. 7, 2017

(30) Foreign Application Priority Data

Dec. 18, 2014 (DE) .................. 10 2014 118 974

(51) Int. Cl.
*G01S 7/48* (2006.01)
*G01S 7/481* (2006.01)
*G01S 17/42* (2006.01)

(52) U.S. Cl.
CPC .......... *G01S 7/4817* (2013.01); *G01S 7/4813* (2013.01); *G01S 17/42* (2013.01)

(58) Field of Classification Search
CPC ....... G01C 3/08; G01S 7/4813; G01S 7/4817; G01S 7/497; G01S 17/08; G01S 17/42
See application file for complete search history.

(56) References Cited

U.S. PATENT DOCUMENTS

| 6,486,474 B1 | 11/2002 | Owen et al. |
| 2001/0035946 A1 | 11/2001 | Nakase et al. |

(Continued)

FOREIGN PATENT DOCUMENTS

| DE | 12 64 797 B | 3/1968 |
| DE | 10 2005 055 572 B4 | 8/2007 |

(Continued)

OTHER PUBLICATIONS

International Search Report issued in PCT/EP2015/079335 dated Feb. 25, 2016 (3 pages).

(Continued)

*Primary Examiner* — Luke D Ratcliffe
(74) *Attorney, Agent, or Firm* — Osha Liang LLP

(57) ABSTRACT

The invention relates to an optical separating means 21 for a deflection mirror arrangement 1 of a laser scanner 2. The invention also relates to a deflection mirror arrangement comprising a separating means of this kind, and also to a laser scanner comprising a deflection mirror arrangement of this kind comprising optical separating means.
The optical separating means 21 comprises a substantially rigid separating wall 17 for separating a receiving mirror region 19 of a deflection mirror 15, 16 from a transmitting mirror region 18, wherein the separating wall 17 has a rectilinear edge section. The separating means 21 has fastening webs 23, which are arranged on both sides of the (Continued)

Figure 1:
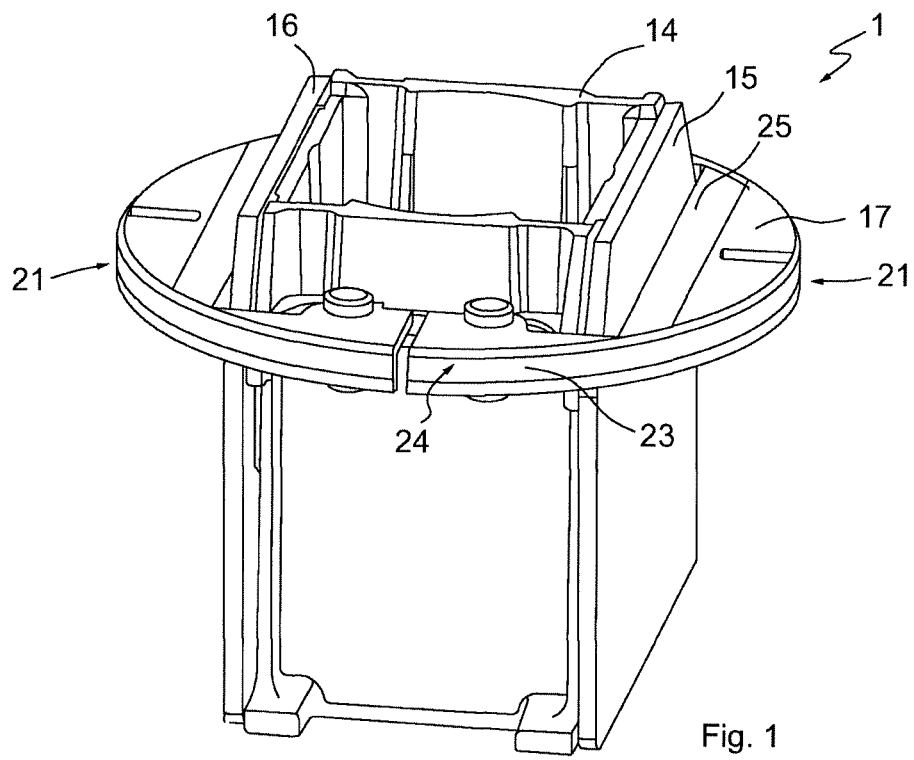

rectilinear edge section 22 of the separating wall 17, for fastening to a mirror support 14.

In order to enable fault-free assembly of a deflection mirror arrangement for a laser scanner, an elastically deformable seal element 25 is arranged along the rectilinear edge section 22 of the separating wall according to the invention.

7 Claims, 2 Drawing Sheets

(56) References Cited

U.S. PATENT DOCUMENTS

| | | | |
|---|---|---|---|
| 2011/0235018 A1* | 9/2011 | Mori | G01C 3/08 |
| | | | 356/5.01 |
| 2013/0265590 A1* | 10/2013 | Eisele | G01S 7/4816 |
| | | | 356/625 |

FOREIGN PATENT DOCUMENTS

| | | |
|---|---|---|
| DE | 10 2009 009 893 A1 | 9/2009 |
| DE | 10 2008 019 615 A1 | 11/2009 |
| DE | 10 2010 041937 A1 | 4/2012 |
| DE | 102010047984 A1 | 4/2012 |
| WO | 2014/097858 A1 | 6/2014 |

OTHER PUBLICATIONS

Written Opinion of the International Searching Authority issued in PCT/EP2015/079335 dated Feb. 25, 2016 (6 pages).

German Search Report issued in Application No. 10 2014 118 974.4 created on Sep. 17, 2015 (10 pages).

\* cited by examiner

LASER SCANNER, DEFLECTION MIRROR ARRANGEMENT FOR IT, AND OPTICAL SEPARATING MEANS FOR A DEFLECTION MIRROR ARRANGEMENT

The invention relates to an optical separating means comprising a separating wall for a deflection mirror arrangement of a laser scanner. The invention also relates to a deflection mirror arrangement for a laser scanner. The invention further relates to a laser scanner comprising a deflection mirror arrangement and also an optical separating means of this kind.

An extremely wide variety of driving assistance systems, that is to say electronic auxiliary devices for assisting the driver in certain driving situations, are increasingly being used in the automotive sector. In doing so, a large number of driver assistance systems take into account information relating to objects in the area surrounding the motor vehicle, which information is provided by optoelectronic detection devices. Laser scanners are often used as optoelectronic detection devices, which laser scanners operate in accordance with the time-of-flight method and therefore have a laser for transmitting laser pulses into the area surrounding the laser scanner and also one or more optoelectronic receivers for reflected beams. Laser-based systems of this kind are known by the name "LIDAR" ("Light detection and ranging").

In a laser scanner, the transmitted laser pulses are deflected by means of a pivotable mirror arrangement such that the field of view of the laser scanner is scanned within a specific scanning angle range. In this case, the deflection mirror arrangement has a mirror support which can be rotationally driven about a rotation axis and supports at least one deflection mirror. In this case, one laser pulse is transmitted for each scanning angle, as a result of which the field of view is scanned. In the same angular step, the reflected beams are received by means of the optical receiver of the laser scanner. In this case, the optical receiver has at least one detector, for example a photodiode which generates an electrical signal when a reflected beam is received. If an evaluation device identifies an echo in the reception signal of an optoelectronic detector, it can be attributed, in principle, to reflections from a target object in the surrounding area. The propagation time between transmission and reception of the echo is proportional to the distance from the object. The distance for the respective angular step of the laser scanner is ascertained from measurement of the propagation time.

DE 10 2005 055 572 B4 discloses a scanning optical distance sensor comprising a laser as optical transmitter and at least one detector as optical receiver and a deflection unit. The deflection unit comprises a first mirror which is associated with the optical transmitter and deflects the laser pulses onto the scene to be surveyed. A second mirror, which deflects the laser pulses back-scattered by objects onto the at least one detector, is associated with the receiver. The first and the second mirror are arranged on a common rotatable axis and, owing to their arrangement, permit an application-specific distance of the optical axes of the transmitter and of the receiver. The at least one laser and the at least one detector are arranged upright together with their entire electronics system, as a result of which the first mirror, which is associated with the transmitter, and the second mirror, which is associated with the receiver, are situated one above the other in accordance with the upright arrangement of transmitter and receiver.

In order to avoid an optical short-circuit between the optical transmitter and the receiver of a laser scanner comprising a deflection mirror arrangement, optical separating means for the deflection mirror arrangement are known, which optical separating means have a substantially rigid separating wall for separating a receiving mirror region of a deflection mirror from a transmitting mirror region. When the separating means is in the installed state, the separating wall lies substantially perpendicular to the rotation axis of the mirror support and engages over the deflection mirror by way of a rectilinear edge section. The separating means is fastened to the mirror support by means of fastening webs which are arranged on both sides of the rectilinear edge section of the separating wall. The separating means is usually screwed to the mirror support, so that the separating wall is fixed and optically separates the receiving mirror region from the transmitting mirror region. This prevents undesired stray light from having an influence on the optical receiver.

A phenomenon known in series production is that different components of one series differ to a greater or lesser extent from a standard. In this case, series production is often facilitated by production tolerances of the components involved. However, in the case of series production of laser scanners, it is also possible for a gap to form between the deflection mirror and the inner edge of the separating means in the case of production within tolerance ranges. Owing to the gap, contaminants can pass between the mirror regions which are actually to be separated. However, it is possible, in particular, for stray light to enter the receiving mirror region and as a result trigger malfunctions of the laser scanner. In addition, separating means which are produced with the maximum permissible tolerances can be fitted to the mirror support only with high contact-pressure forces, this resulting in distortion of the mirror and therefore in corruption of the diversion of the light beam during operation of the laser scanner.

The present invention is based on the object of enabling fault-free=series production of a deflection mirror arrangement for a laser scanner.

According to the invention, this object is achieved by an optical separating means comprising a separating wall for a deflection mirror arrangement of a laser scanner. The object is also achieved by a deflection mirror arrangement comprising a separating means of this kind. The object is further achieved by a laser scanner comprising a deflection mirror arrangement of this kind and an optical separating means of this kind.

According to the invention, an elastically deformable seal element is arranged along the inner edge section, that is to say the edge section which faces the deflection mirror, of the separating wall. The seal element closes off a gap between the edge of the separating wall and the surface of the deflection mirror in a sealing manner, irrespective of the production tolerances of the joined components. The production-related differences in dimensions of the separating means components are compensated for by deformation of the seal element during assembly of the laser scanner. When the separating means is fitted and pressed onto the mirror support, restoring forces corresponding to the contact-pressure force applied when joining the separating means are produced in the elastically deformable material of the seal element. The restoring forces ensure tight closure. The seal element is composed of an opaque material, so that the passage of stray light is prevented.

In one exemplary embodiment, the seal element is an assembly foam which is applied along the inner edge, for example a polyurethane foam. The foam bead is preferably applied to the gap between the separating wall and the deflection mirror as a continuous foam bead after fitting of the separating means by means of the fastening webs.

The separating means is preferably undersized in the region of the edge section of the separating wall, that is to say is dimensioned in such a way that, taking into account the length of the fastening webs and the fastening means of the said fastening webs in the installed position of the separating means, an intentional gap is formed between the surface of the deflection mirror and the rectilinear edge section of the separating wall which engages over the deflection mirror. This prevents distortion of the deflection mirror by the separating wall, wherein the seal element closes the intentional gap.

In a preferred exemplary embodiment of the invention, the elastically deformable seal element is in the form of a lip seal which has a covering lip which can be elastically angled when fitting the separating means. The cross section of the lip seal has a fastening section, which is fastened to the separating wall or to the edge section which is provided for opposition with the deflection mirror, and the covering lip which projects out of the fastening section. The covering lip has, in accordance with the principle of a lip seal which is known per se, a thin cross section in relation to the fastening section, as a result of which the covering lip can be elastically angled during fitting. During fitting, the separating means is initially positioned in a direction parallel to the plane of the deflection mirror and pressed onto the deflection mirror at the intended height, until the fastening webs overlap with a fastening receptacle on the mirror support. In the process, the covering lip is angled and, on account of the elastic restoring forces of the covering lip which can be angled, the gap between the separating wall and the deflection mirror is mechanically and optically sealed off over the entire length.

The lip seal is advantageously composed of an elastomer which is permanently attached to the separating means and applies the restoring forces which are desired for the purpose of sealing off the gap between separating wall and deflection mirror.

In an advantageous embodiment of the invention, the lip seal or the material which forms the lip seal is injection-moulded onto the separating wall or the rectilinear edge section of the said separating wall.

Cost-effective production of the separating means according to the invention for a deflection mirror arrangement is realized when the lip seal is adhesively bonded to the separating wall or to the inner edge section of the said separating wall.

In a preferred embodiment of the invention, the lip seal is connected to the separating wall in an interlocking manner, with the result that the lip seal is permanently held on the separating wall and the lip seal is prevented from becoming detached.

A particularly advantageous embodiment of a deflection mirror arrangement for a laser scanner comprises two deflection mirrors which are arranged at a radial distance from the rotation axis on opposite sides of the mirror support. In this way, the field of view can be scanned at twice the scanning rate with the same number of rotations of the deflection mirror arrangement. In particular, the respective separating means can be fitted in a simple manner when two deflection mirrors are in opposite positions. The separating means of the two deflection mirror lie at the same height, wherein the respective fastening webs of the separating means also lie at the same height and can be fastened to the mirror support in a simple manner. In this case, it is possible to fasten the two separating means to a common receptacle, for example a screw receptacle, wherein the free ends of the fastening webs lie adjacent to one another.

This separating means according to the invention for a deflection mirror arrangement and the deflection mirror arrangement which is equipped with the separating means ensure series production of laser scanners without wastage and therefore cost-effective production of the laser scanner.

Figure 2:
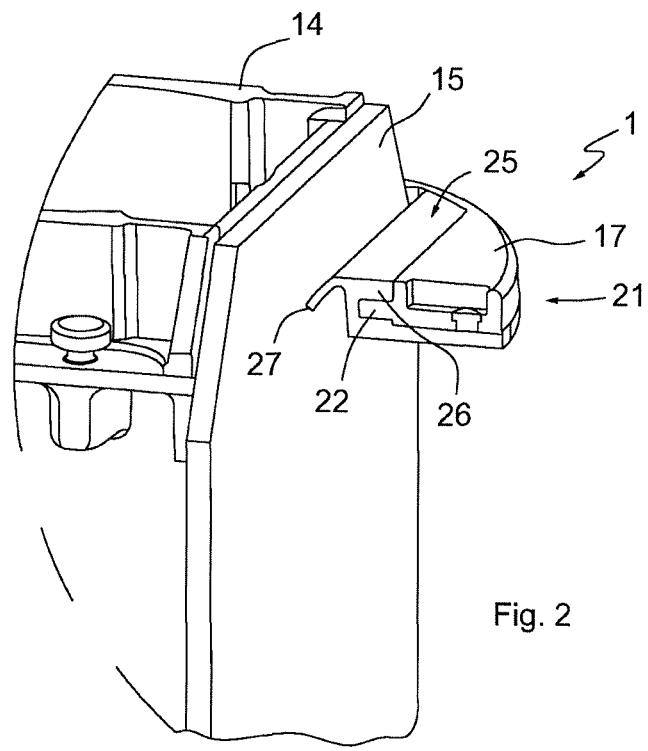
Figure 3:
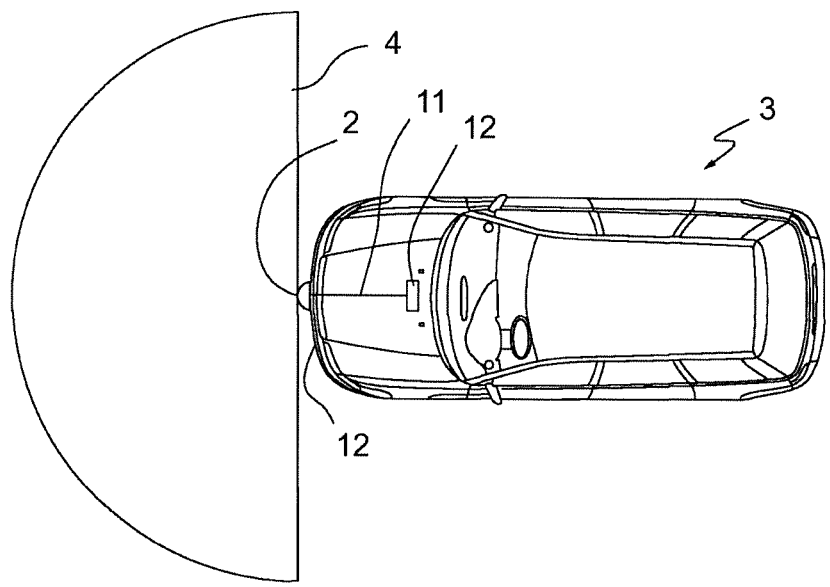
Figure 4:
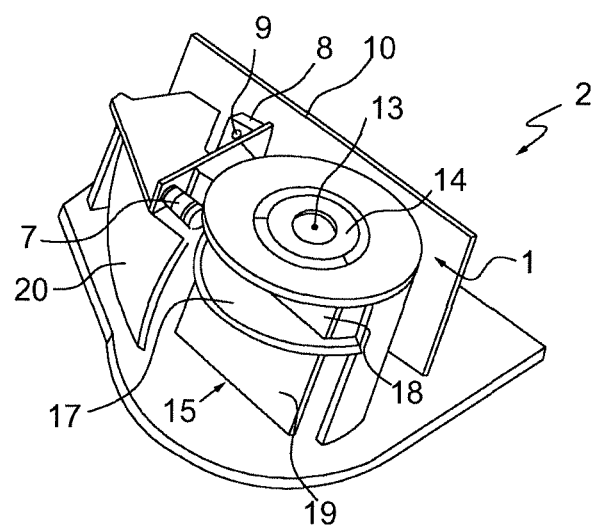

Exemplary embodiments of the invention are explained in more detail below with reference to the drawing, in which:

FIG. 1: shows a perspective view of an exemplary embodiment of a deflection mirror arrangement, FIG. 2: shows a sectioned view of the deflection mirror arrangement according to FIG. 1, FIG. 3: shows a plan view of a motor vehicle comprising a laser scanner, FIG. 4 shows a perspective view of a laser scanner comprising a deflection mirror arrangement.

FIG. 1 and FIG. 2 show perspective views of an exemplary embodiment of a deflection mirror arrangement 1 for a laser scanner 2 (FIG. 4). The laser scanner 2 serves to detect objects in the area surrounding a vehicle 3 (FIG. 3). In the exemplary embodiment shown in FIG. 3, the laser scanner 2 is arranged in the front region of the motor vehicle 3 and therefore detects a field of view 4 in front of the motor vehicle 3. The laser scanner 2 is arranged in the front region of the motor vehicle 3, for example behind a radiator grille or on the bumper 5. In further exemplary embodiments, not shown, the laser scanner 2 is arranged in the side region of the motor vehicle 3 and detects, with its field of view 4, objects next to the motor vehicle 3. In a further exemplary embodiment, the laser scanner 2 can be arranged in the rear region of the motor vehicle.

The laser scanner 2 has, in a housing 6, an optical transmitter 7, specifically a laser, for transmitting laser pulses. An optical receiver 8 receives reflections from objects in the field of view and has one or more optoelectronic detectors 9. The receiver 8, together with its detectors 9, is arranged in an integrated circuit 10. When light beams are received, the optoelectronic detectors generate a corresponding electrical reception signal 11 which is provided to an evaluation electronics system 12.

The laser scanner 2 comprises a deflection mirror arrangement 1 which comprises a mirror support 14 which can be rotationally driven about a rotation axis 13. The mirror support 14 supports two deflection mirrors 15, 16 which, together with the mirror support 14, can be rotated about the rotation axis 13. The deflection mirrors 15, 16 lie parallel to one another on opposite sides of the mirror support 14 and in this case are each at a radial distance from the rotation axis 13. The rotation axis 13 lies parallel to the planes of the deflection mirrors 15, 16.

A separating wall 17 which extends substantially radially in relation to the rotation axis 13 and separates the respective deflection mirrors 15, 16 into a transmitting mirror region 18 and a receiving mirror region 19 is associated with each deflection mirror 16. The deflection mirror arrangement 1 is driven by means of a stepper motor, not illustrated, wherein the optical transmitter 7 emits a laser pulse, which is emitted by the transmitting mirror region 18 in a specific direction in the field of view 4, in each angular step of the deflection mirror arrangement 1. In this way, the field of view 4 (FIG. 3) is scanned in steps. Reception beams which are reflected from objects are deflected by the receiving mirror region 19 to the receiver 8 by means of a receiving optics system 20.

The transmitting mirror region 18 is arranged level with the optical transmitter 7 with respect to the axial direction of the rotation axis 13. The receiving mirror region 19 is arranged level with the detector 8. The optical transmitter 7 and the receiver 8 are therefore arranged one above the other relative to the rotation axis 13 of the deflection mirror arrangement 1, so that only transmission beams are emitted by means of the receiving mirror region 19 and only reflected beams are deflected to the receiver 8 by means of the receiving mirror region 19. The laser scanner 2 operates in accordance with the time-of-flight principle, wherein the time until a light beam is received is measured and, if there are echoes in the reception signal, conclusions are drawn about the position of an object in the field of view 4.

The radial separating wall 17 is a constituent part of a separating means 21 which is a separate component and is explained in more detail below with reference to FIG. 1 and FIG. 2. According to the design already explained in relation to FIG. 4, the deflection mirror arrangement 1 has a mirror support 14 on which two deflection mirrors 15, 16 are arranged at a radial distance from the rotation axis on opposite sides of the mirror support 14. The separating wall 17 is a constituent part of the separating means 21 which is preferably a stamped part. The separating means 21 has an inner edge which comprises a rectilinear edge section 22 which engages over the respective deflection mirror 15 when the separating means 21 is in the installed position shown. Fastening webs 23 which protrude beyond the edge section 21 and are fastened to the mirror support at their free ends 24 are formed on the separating means 21 on both sides of the edge section 22. In the exemplary embodiment shown, the separating means 21 is screwed to the mirror support 14.

The edge section 22 lies at such a distance from the free ends 24 of the fastening webs 23, or from the position of the fastening bores 25 which are cut into the fastening webs 23, that the edge section 22 runs close to the surface of the deflection mirror 15, 16 when the separating means 21 is in the installed position. During production of the separating means, the production tolerances are determined such that a narrow gap remains between the edge section 22 and the surface of the respective deflection mirror 15, 16. This prevents the deflection mirror 15, 16 from being distorted with excessively high contact-pressure forces when the separating means 21 is fitted to the deflection mirror arrangement 1.

An elastically deformable seal element which mechanically and optically closes the gap between the separating means 21 and the deflection mirror 15, 16 over the entire width of the deflection mirror 15, 16 is arranged along the edge section 22. The seal element is in the form of a lip seal 25. The lip seal 25 has a cross section with a fastening section 26 which is fastened to the separating wall 17 and with a covering lip 27 which projects out of the fastening section 26 and can be angled. In this case, the covering lip 27 is of narrow design, that is to say has a small width in relation to the length up to the end which can be angled, and therefore can be elastically angled in the event of a relative movement in the plane of the deflection mirror 15, 16. The covering lip 27 preferably consists of an elastomer. In this case, the covering lip 27 can be held on a rigid fastening section 26. In a further exemplary embodiment, the entire lip seal 25, together with the fastening section 26 and the covering lip 27, is integrally produced from an elastically deformable material. In an advantageous exemplary embodiment, the lip seal 25 is injection-moulded onto the separating wall 17 or the rectilinear edge section 22, which is formed on the separating wall 17, over the entire length of the edge section 22. As an alternative, the lip seal 25 is adhesively bonded to the separating wall 17.

In the exemplary embodiment according to FIG. 2, the lip seal 25 is connected to the separating wall 17 in an interlocking manner.

In the exemplary embodiment shown, the deflection mirrors 15, 16 are continuous mirror parts, the surfaces of which are subdivided into a receiving mirror region 19 and a transmitting mirror region 18 by the separating means 21. In a further exemplary embodiment, not shown, the deflection mirror 15, 16 consists of two separate mirror parts which are fastened to the mirror support 14 one above the other and are separated by the separating means 21. In other words, the separating means 21 covers a gap between the two mirror surfaces of a deflection mirror 15, 16.

LIST OF REFERENCE SYMBOLS

1. Deflection mirror arrangement
2. Laser scanner
3. Motor vehicle
4. Field of view
5. Bumper
6. Housing
7. Optical transmitter
8. Receiver
9. Detector
10. Circuit
11. Reception signal
12. Evaluation electronics system
13. Rotation axis
14. Mirror support
15. Deflection mirror
16. Deflection mirror
17. Separating wall
18. Transmitting mirror region
19. Receiving mirror region
20. Receiving optics system
21. Separating means
22. Edge section
23. Fastening web
24. Free end
25. Lip seal
26. Fastening section
27. Covering lip

The invention claimed is:

1. An optical separating means for a deflection mirror arrangement of a laser scanner, comprising:
   a rigid separating wall for separating a receiving mirror region of a deflection mirror from a transmitting mirror region,
   wherein the separating wall has a rectilinear edge section and the optical separating means has fastening webs which are arranged on both sides of the edge section,
   wherein an elastically deformable seal element is arranged along the edge section,
   wherein the elastically deformable seal element is in the form of a lip seal and has a cross section with a fastening section, which is fastened to the separating wall, and a covering lip which projects out of the fastening section and which is elastically angled.

2. The separating means according to claim 1, wherein the lip seal is injection-moulded onto the edge section of the separating wall.

3. The separating means according to claim 1, wherein the lip seal is adhesively bonded to the rectilinear edge section of the separating wall.

4. The separating means according to claim 1, wherein the lip seal is connected to the separating wall in an interlocking manner.

5. A deflection mirror arrangement for a laser scanner comprising:
- a mirror support configured to be rotationally driven about a rotation axis and to support at least one deflection mirror; and
- a separating means held on the mirror support, comprising a rigid separating wall which lies perpendicular to the rotation axis and engages over the deflection mirror by way of a rectilinear edge section and separates a receiving mirror region from a transmitting mirror region,
- wherein the separating means is fastened to the mirror support and bears against the deflection mirror by an elastically deformable seal element which is arranged on the separating wall along the rectilinear edge section,
- wherein the elastically deformable seal element is in the form of a lip seal and has a cross section with a fastening section, which is fastened to the separating wall, and a covering lip which projects out of the fastening section and which is elastically angled.

6. The deflection mirror arrangement according to claim 5, further comprising two deflection mirrors arranged at a radial distance from the rotation axis on opposite sides of the mirror support.

7. A laser scanner comprising:
- a deflection mirror arrangement according to claim 5; and
- a separating means for the deflection mirror arrangement comprising a rigid separating wall for separating a receiving mirror region of a deflection mirror from a transmitting mirror region,
- wherein the separating wall has a rectilinear edge section and the separating means has fastening webs which are arranged on both sides of the edge section,
- wherein an elastically deformable seal element is arranged along the edge section.

* * * * *